Aug. 12, 1930.  J. A. KINNARD  1,772,722
THERMOSTATICALLY OPERATED SHUTTER
Filed Nov. 17, 1928   2 Sheets-Sheet 1
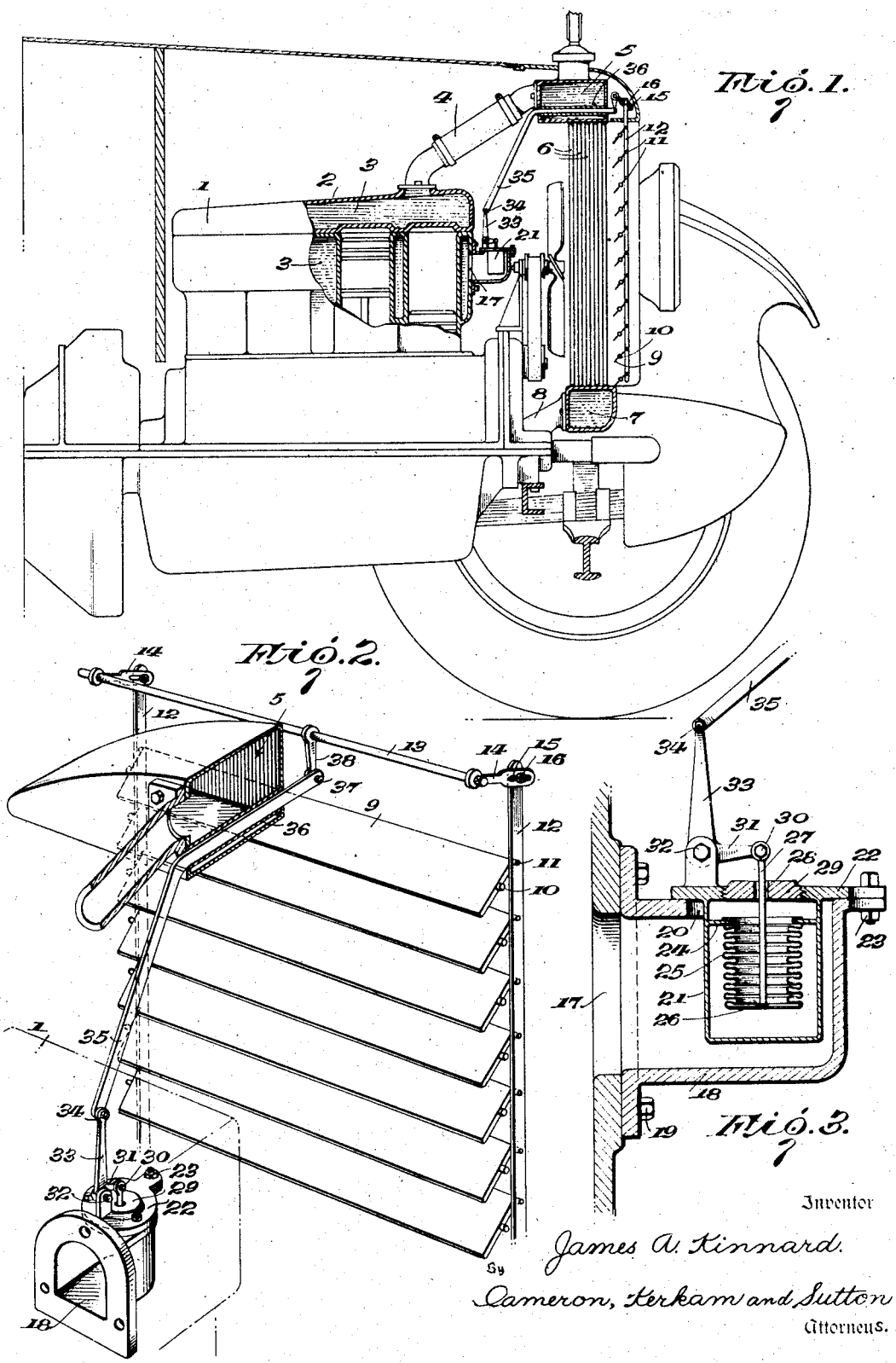
Inventor
James A. Kinnard.
By Cameron, Kerkam and Sutton
Attorneys.

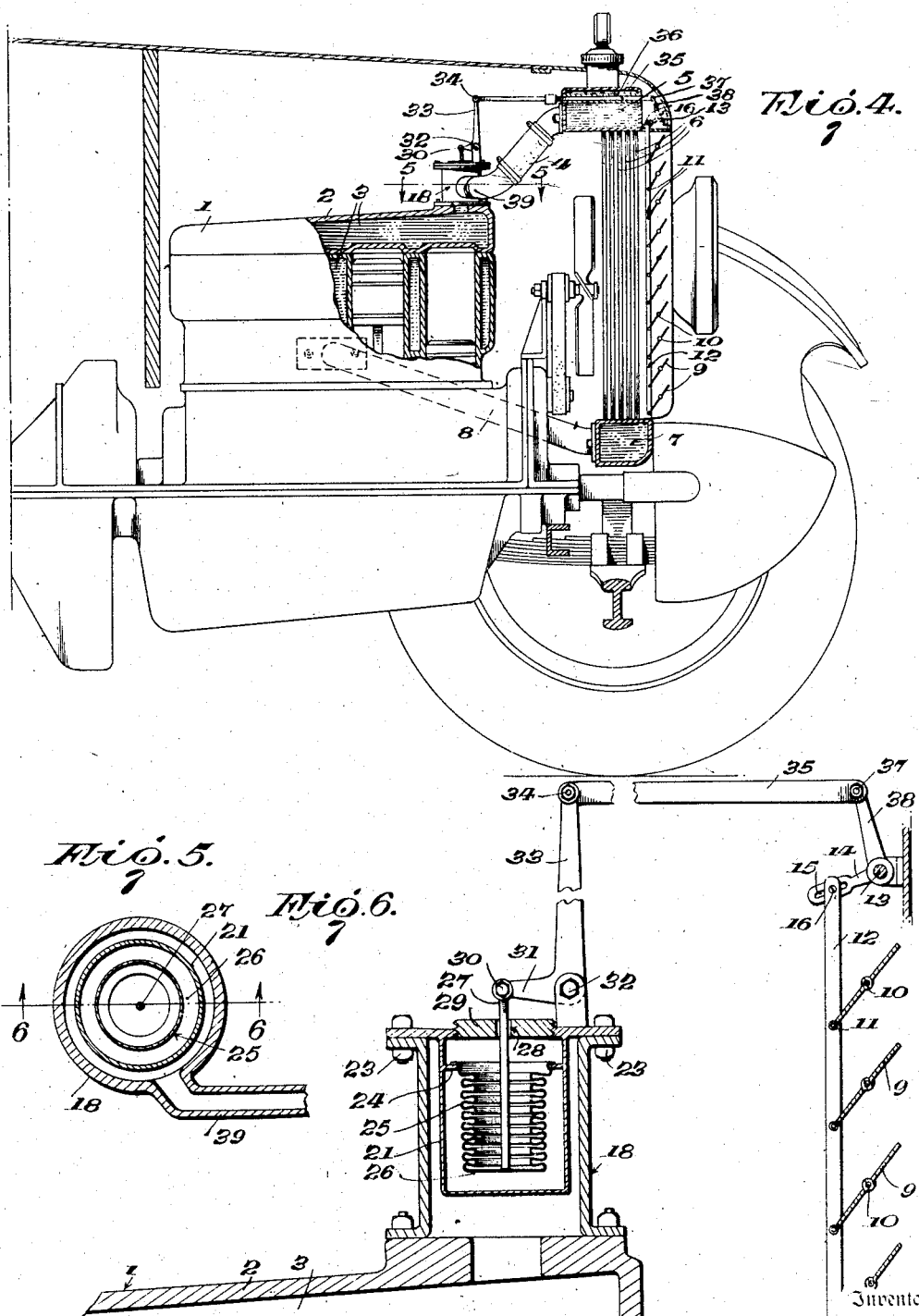

Patented Aug. 12, 1930

1,772,722

UNITED STATES PATENT OFFICE

JAMES A. KINNARD, OF DETROIT, MICHIGAN, ASSIGNOR TO THE FULTON SYLPHON COMPANY, OF KNOXVILLE, TENNESSEE, A CORPORATION OF DELAWARE

THERMOSTATICALLY-OPERATED SHUTTER

Application filed November 17, 1928. Serial No. 320,159.

This invention relates to means for the thermostatic control of radiator shutters for automobiles.

It has been proposed heretofore to operate a shutter adjacent an automobile radiator by means of a thermostat to regulate the flow of air through the radiator. Such thermostats have generally been incorporated with the shutter in a unitary structure, as in the so-called "Winterfront" type, or have been built into the power plant and connected in some suitable way with the shutter, the thermostat being usually placed in one of the pipes provided for circulating the cooling medium between the radiator and the cooling jacket of the motor. In the latter instance, it is necessary to insert the thermostatic element within the circulating pipe in some manner, so that specially constructed parts are required. Furthermore, in such constructions it has been necessary to employ some sort of operating rod, stem, or the like, extending from the thermostatic element within the circulating pipe to the outside for connection with the shutter. For this purpose a packed sliding fit is necessary, which is not only expensive but also a continuous source of trouble since leakage will result despite all practicable precautions, due to wear of the packing employed, etc. Besides, the frictional resistance of the packing to the movement of the operating rod is objectionable.

It is an object of this invention to provide a thermostatic shutter control wherein the thermostatic element is mounted directly on the motor and directly controls the shutter in accordance with the temperature in the motor jacket rather than that in other parts of the cooling system.

Another object of the invention is to provide novel means to mount the thermostat and subject it to the temperature of the motor, which means is simple, economical and durable.

A further object is to provide novel means whereby the thermostatic element may be subjected to the temperature of the medium within the cooling medium and connected to operate the shutter outside of the cooling system without destroying the continuity of the walls of said system and without the use of packing around sliding operating rods, etc., thus eliminating wear and consequent leakage and also friction.

Other objects will appear hereinafter as the description of the invention proceeds.

Two embodiments of the invention have been illustrated in the accompanying drawings, but it is to be expressly understood that said drawings are for purposes of illustration only and are not to be construed as a definition of the limits of the invention, reference being had to the appended claims for this purpose.

In said drawings,—

Fig. 1 is a diagrammatic view of a portion of an automobile equipped with a thermostatic shutter control embodying the invention;

Fig. 2 is a perspective view of a thermostat, shutter and operating connections therebetween;

Fig. 3 is a sectional view of the thermostat;

Fig. 4 illustrates another embodiment of the invention;

Fig. 5 is a section on the line 5—5 of Fig. 4; and

Fig. 6 is a sectional view of the thermostat on the line 6—6 of Fig. 5, together with a portion of the shutter and operating mechanism therefor.

Referring now to Figs. 1 to 3, inclusive, wherein like reference numerals indicate like parts, there is shown diagrammatically a portion of an automobile including a motor 1 of any suitable type. Said motor is shown as provided with the usual cooling system, which may comprise, for example, a cooling jacket 2 providing a space 3 surrounding the cylinders and adapted to contain a suitable cooling medium, which space is connected by means of a pipe or hose 4 to the tank 5 of the automobile radiator. A series of small pipes 6 connect the tank 5 with a tank 7 at the bottom of the radiator, and the latter communicates through a pipe or hose 8 with the cooling jacket of the motor. It is to be expressly understood that the above described system constitutes no part of the invention, but is merely illustrative of one of the types of cooling systems commonly employed and well known in the art.

The cooling medium circulating through the system above described, such as water, is cooled as it passes through the pipes 6 from the tank 5 to the tank 7 by means of a flow of air around said pipes, and this flow may be suitably controlled by means of a shutter of any suitable type. Referring to Fig. 2, such a shutter may comprise, for example, a plurality of horizontally disposed shutter elements 9, provided at their ends with pivot pins 10 whereby said elements may be operatively mounted in any suitable frame (not shown). Any suitable means for rotating the shutters from their open position to closed position, or vice versa, may be employed, and in the form shown each of said elements 9 is provided at each of its forward corners with a pin 11, all of the pins 11 at one end of all of the shutter elements engaging a vertically and laterally movable rod 12. A shaft 13, journaled at its ends in the shutter frame (not shown), carries a pair of arms 14 which are provided with slots 15 engaging pins 16 on the rods 12. It will be seen that when the shaft 13 is rotated, the arms 14 act on the rods 12 to rotate the shutter elements 9 about their pivot pins 10 and to open or close the shutter, but it is to be understood that the shutter construction shown and described is illustrative only and that any suitable construction may be employed.

Suitable means are provided whereby the shaft 13 may be rotated to operate the shutter in accordance with the temperature of the cooling medium in the cooling system, and preferably in accordance with the temperature of the medium in the space 3. To this end a thermostat is employed, preferably of the corrugated bellows type, which is subjected to the temperature of the water or other medium within said space, said thermostat being mounted directly on the motor itself. The location of the thermostat will depend upon the design of the power plant and the relative location of the various elements thereof. In the form of the invention shown in Fig. 1, an opening 17 is provided in the front of the motor jacket, and a housing 18 of any suitable shape and construction is secured to said motor surrounding the opening 17 by means such as bolts 19. Said housing 18 is provided with an opening 20 in which is inserted the thermostatic element, so that the latter is subjected to the temperature of the cooling medium in the jacket.

Preferably, the thermostat employed is of the cup type, comprising a rigid cup having therein a collapsible and extensible wall which is secured to a flange of said cup and forms therewith a collapsible and expansible thermostatic vessel. The rigid cup, when inserted in the opening 20, may be detachably or permanently secured to the housing 18, but in either event it constitutes a rigid permanent part of the walls of the cooling system, all of the movable elements of the thermostat being outside said walls. In the form shown somewhat diagrammatically in Fig. 3, said thermostat includes the cup 21 having a flange 22, said cup being inserted in the opening 20 and said flange being secured to the housing 18 by means of bolts 23. Said cup 21 is provided with an internal flange 24 to which is secured in any suitable manner as by soldering one end of a flexible corrugated wall 25, the other end of said wall having either integral therewith or secured thereto in any suitable manner a movable head 26. The space between the flexible wall 25 and cup 21 constitutes an enclosed chamber which may be partially filled with a suitable volatile liquid, whereby a thermostatic element is formed.

The head 26 of the thermostat may be adapted in any suitable manner to operate the shaft 13 controlling the shutter. While any suitable means may be employed, it is preferred to connect said head directly with the shaft by means of a system of rods and levers and to this end an operating rod 27 is secured to the head 26 and passes through an opening 28 in a plug 29 in the top of the cup 21. Rod 27 is pivotally connected at 30 with one arm 31 of a bell crank lever pivoted at 32 in any suitable manner on the motor, the other arm 33 of which is pivotally connected at 34 with one end of a connecting rod 35. In the form shown, the rod 35 extends upwardly and is curved intermediate its ends to extend horizontally through a tube 36 passing through the tank 5, and the other end of the rod is pivotally connected at 37 with an arm 38 fast on the shaft 13. It will be apparent that as the thermostat expands and contracts, the arm 38 is operated by means of the connections shown to rotate the shaft 13 and control the shutter.

In some instances, depending upon the design of the power plant, it may be undesirable to mount the thermostat in the location shown in Fig. 1 because of lack of room or other reason. In such case it may be preferable to employ the construction shown in Figs. 4 to 6, inclusive. Throughout these views, the design of the motor, radiator, and cooling system is substantially the same as previously described in connection with Figs. 1 to 3, and like reference characters are employed to designate the corresponding elements. A similar shutter, including the pivoted shutter elements 9 and the operating rod 12, is likewise shown, the latter being operated as before by means of arms 14 fast on a shaft 13. In the present instance, however, the thermostatic housing 18 is mounted on the top of the motor and preferably serves also as a part of the circulating system to which the hose 4 may be connected, an outlet 39 being formed at one side of said housing for this purpose. The thermostat and the arrangement of connections between said thermostat and the shaft 13 is likewise substantially the same, except that in this location of the thermostat it is unnecessary to bend the connecting rod 35.

The use of a cup type thermostat makes possible the elimination of all parts having sliding fits, prevents leakage, and eliminates friction. The stationary wall of the thermostat may be secured tightly to the housing, forming a joint of permanent character, so that the circulating system is substantially continuous and completely closed, whereas the movable wall of the thermostat is freely movable external to said circulating system and is connected to operate the shutter. Mounting the thermostat directly on the motor provides accurate control of the shutter in accordance with the temperature of the motor itself, and eliminates the necessity for the expensive and more complicated constructions required in systems wherein the thermostat is located in the circulating pipes, while the simplicity of the design and the economy and durability of a construction embodying the invention will be apparent. Obviously, the invention may be applied to other forms of cooling systems than that described herein, and likewise the particular form and arrangement of the thermostat shutter, and the connecting systems shown in the drawings, may be varied, since any one or all of the individual elements may be replaced by other similar elements known to the art.

Therefore, while only two embodiments of the invention have been described and illustrated in the drawings, it will be apparent that the invention is capable of a variety of mechanical expressions, many of which will now occur to those skilled in the art, and that changes may be made in the form, detail and arrangement of the various parts without departing from the spirit of the invention. Reference is therefore to be had to the appended claims for a definition of the limits of the invention.

What is claimed is:

1. In an automobile including a hydrocarbon motor provided with a temperature regulating system including a cooling jacket for said motor, a radiator, and means interconnecting said jacket and radiator to constitute a circulating system, a shutter adjacent said radiator and adjustable to screen the same to a varying extent, a housing directly communicating with said jacket, a thermostatic device mounted in said housing and including a collapsible and expansible vessel subjected to the temperature within said jacket and having a movable wall external to said system, and means operatively connecting said wall with said shutter.

2. In an automobile including a hydrocarbon motor provided with a temperature regulating system including a cooling jacket for said motor, a radiator, and means interconnecting said jacket and radiator to constitute a circulating system, a shutter adjacent said radiator and adjustable to screen the same to a varying extent, a thermostatic vessel mounted on said motor and subjected to the temperature within said system, said vessel comprising a rigid wall forming a part of the walls of said circulating system and a collapsible and extensible wall having a head freely movable external to said system, and means operatively connecting said head and said shutter.

3. In an automobile including a hydrocarbon motor provided with a temperature regulating system including a cooling jacket for said motor, a radiator, and means interconnecting said jacket and radiator to constitute a circulating system, a shutter adjacent said radiator and adjustable to screen the same to a varying extent, a cup thermostat comprising a rigid cup forming a part of the walls of said circulating system and a collapsible and extensible wall having a movable head external to said system, and means operatively connecting said head and said shutter.

4. In an automobile including a hydrocarbon motor provided with a temperature regulating system including a cooling jacket for said motor, a radiator, and means interconnecting said jacket and radiator to constitute a circulating system, a shutter adjacent said radiator and adjustable to screen the same to a varying extent, a rigid cup forming a part of the walls of said system, a collapsible and extensible wall secured to said cup external to said system and constituting with said cup a thermostatic vessel, said wall having a movable head, and means including a rod operatively connected to said head and shutter for operating said shutter in accordance with the temperature within said system.

5. Apparatus of the class described comprising a hydrocarbon motor having a cooling jacket, a radiator, a shutter adjacent said radiator, said jacket having an opening therein, a housing mounted on said jacket adjacent said opening, a thermostat in said housing, said thermostat having a rigid immovable outer wall subjected to the cooling medium in said housing, and means including pivoted levers directly connecting said thermostat and said shutter whereby movement of said thermostat directly actuates said shutter.

6. Apparatus of the class described comprising a hydrocarbon motor having a cooling jacket, a radiator, a shutter adjacent said radiator, said jacket having an opening therein, a housing mounted on said jacket adjacent said opening, a cup thermostat inserted in said housing, said thermostat having a movable head external to the cooling medium in said housing and means operatively connecting said head and said shutter.

7. Apparatus of the class described comprising a hydrocarbon motor having a cooling jacket, a radiator, a shutter adjacent said radiator, said jacket having an opening therein, a housing mounted on said jacket adjacent said opening, a cup thermostat inserted in said housing, said thermostat having a movable head external to the cooling medium in said housing, and means including pivoted levers directly connecting said head and said shutter whereby movement of said thermostat directly actuates said shutters.

8. Apparatus of the class described comprising a hydrocarbon motor having a cooling jacket, a radiator, a shutter adjacent said radiator, said jacket having an opening therein, a housing mounted on said jacket adjacent said opening, a cup inserted in said housing, a flexible wall secured to said cup external to the cooling medium in said housing and forming with said cup a thermostatic vessel, and means operatively connecting said wall with said shutter.

9. Apparatus of the class described comprising a hydrocarbon motor having a cooling jacket, a radiator, a shutter adjacent said radiator, said jacket having an opening therein, a housing mounted on said jacket adjacent said opening, a cup inserted in said housing, a flexible wall secured to said cup external to the cooling medium in said housing and forming with said cup a thermostatic vessel, and means including pivoted levers directly connecting said wall and said shutter whereby movement of said wall directly actuates said shutter in accordance wih the temperature within said housing.

10. Apparatus of the class described comprising a hydrocarbon motor having a cooling jacket, a radiator, a shutter adjacent said radiator, said jacket having an opening therein, a housing mounted on said jacket adjacent said opening, a cup inserted in said housing, a flexible wall secured to said cup external to the cooling medium in said housing and forming with said cup a thermostatic vessel, a connecting rod, and means operatively connecting said rod with said wall and with said shutter.

11. In an automobile including a hydrocarbon motor provided with a temperature regulating system including a cooling jacket for said motor, a radiator, means interconnecting said jacket and radiator to constitute a circulating system, a shutter adjacent said radiator and adjustable to screen the same to a varying extent, means mounted on said jacket and subjected to the temperature of the medium therein for operating said shutter, said means including a cup thermostat having a rigid cup which forms a part of the walls confining a cooling fluid in said circulating system, and a collapsible and extensible wall mounted within said cup on the side thereof opposite from said fluid and having a movable head operatively connected to said shutter.

12. In an automobile including a hydrocarbon motor provided with a temperature regulating system including a cooling jacket for said motor, a radiator, means interconnecting said jacket and radiator to constitute a circulating system, a shutter adjacent said radiator and adjustable to screen the same to a varying extent, means mounted on said jacket and subjected to the temperature of the medium therein for operating said shutter, said means including a rigid cup forming a part of the fluid confining walls of said system, a collapsible and extensible wall secured to said cup external to said system and constituting with said cup a thermostatic vessel, said wall having a movable head, and means mechanically connected to said head and shutter for operating said shutter in accordance with the temperature within said system.

13. In an automobile including a hydrocarbon motor provided with a temperature regulating system including a cooling jacket for said motor, a radiator, means interconnecting said jacket and radiator to constitute a circulating system, a shutter adjacent said radiator and adjustable to screen the same to a varying extent, means mounted on said jacket and subjected to the temperature of the medium therein for operating said shutter, said means including a rigid cup forming a part of the fluid retaining walls of said system, a collapsible and extensible wall having a movable head located within said cup on the opposite side thereof from said fluid and forming with said cup a thermostatic chamber, and means connecting said movable head with said shutter.

In testimony whereof I have signed this specification.

JAMES A. KINNARD.